(12) United States Patent
Pall et al.

(10) Patent No.: US 7,907,051 B2
(45) Date of Patent: Mar. 15, 2011

(54) TECHNIQUES FOR SETTING AND INDICATING PRESENCE FOR A DEVICE

(75) Inventors: Gurdeep S. Pall, Sammamish, WA (US); Dawson Yee, Bellevue, WA (US); Alex Riemann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 11/451,820

(22) Filed: Jun. 13, 2006

(65) Prior Publication Data

US 2007/0287376 A1    Dec. 13, 2007

(51) Int. Cl.
G08B 1/08    (2006.01)
G06F 15/16    (2006.01)

(52) U.S. Cl. .................. 340/539.1; 709/201

(58) Field of Classification Search ........... 340/539.1; 709/201, 204, 227; 345/173, 156, 157
See application file for complete search history.

(56) References Cited

U.S. PATENT DOCUMENTS

| | | | | |
|---|---|---|---|---|
| 5,608,794 A * | 3/1997 | Larson | | 379/396 |
| 5,630,144 A * | 5/1997 | Woog et al. | | 713/310 |
| 5,793,365 A * | 8/1998 | Tang et al. | | 715/758 |
| 6,065,138 A * | 5/2000 | Gould et al. | | 714/47 |
| 6,147,608 A * | 11/2000 | Thacker | | 340/573.1 |
| 6,282,655 B1 * | 8/2001 | Given | | 726/34 |
| 6,360,252 B1 * | 3/2002 | Rudy et al. | | 709/206 |
| 6,611,281 B2 | 8/2003 | Strubbe | | |
| 7,100,116 B1 * | 8/2006 | Shafrir et al. | | 715/751 |
| 7,348,967 B2 * | 3/2008 | Zadesky et al. | | 345/173 |
| 7,711,815 B2 * | 5/2010 | Garg et al. | | 709/224 |
| 2002/0019816 A1 | 2/2002 | Shafrir et al. | | |
| 2002/0026483 A1 * | 2/2002 | Isaacs et al. | | 709/206 |
| 2004/0127253 A1 | 7/2004 | Hauptvogel et al. | | |
| 2004/0133638 A1 | 7/2004 | Doss et al. | | |
| 2004/0147261 A1 | 7/2004 | Roelands | | |
| 2004/0193686 A1 | 9/2004 | Blagsvedt et al. | | |
| 2004/0201668 A1 | 10/2004 | Matsubara et al. | | |
| 2004/0248588 A1 | 12/2004 | Pell et al. | | |
| 2005/0170847 A1 | 8/2005 | Karlsson et al. | | |
| 2005/0243019 A1 | 11/2005 | Fuller et al. | | |
| 2005/0265296 A1 | 12/2005 | Zhang et al. | | |
| 2005/0271187 A1 | 12/2005 | Bohmer et al. | | |
| 2005/0289470 A1 | 12/2005 | Pabla et al. | | |
| 2006/0005133 A1 * | 1/2006 | Lyle et al. | | 715/708 |
| 2007/0236475 A1 * | 10/2007 | Wherry | | 345/173 |
| 2008/0201438 A1 * | 8/2008 | Mandre | | 709/206 |

(Continued)

OTHER PUBLICATIONS

Vogiazou et al., "Wireless Presence and Instant Messaging", Knowledge Media Institute (KMi), Nov. 2002.

(Continued)

*Primary Examiner* — Benjamin C Lee
*Assistant Examiner* — Sigmund Tang

(57) ABSTRACT

Techniques are provided for specifying a presence setting selection and for displaying a presence indicator status of a user with respect to a device associated with the user. The presence setting selection includes providing an input selection component on a surface of a first component of the device. A presence setting is received at the device in accordance with a manual presence selection made using the input selection component. In connection with the presence indicator status, one or more indicators are provided on a surface portion of a first component of the device. The presence indicator status indicating the presence of the user with respect to the device is received. One or more indicators at the device are set in accordance with the presence indicator status.

20 Claims, 9 Drawing Sheets

U.S. PATENT DOCUMENTS

2008/0242231 A1* 10/2008 Gray .................. 455/66.1

OTHER PUBLICATIONS

Arabshian et al. "Enhancing Enterprise Communications Systems with Wireless Devices and Presence Information", Columbia University Department of Computer Science, Aug. 2002.

Kohno et al. "TACT: Mobile Wireless Terminal for Digitally-Enabled Environments", The Sixth International Conference on Ubiquitous Computing (UbiComp), Sep. 2004.

Milewski et al., "Providing Presence Cues to Telephone Users", Proceedings of the 2000 ACM Conference on Computer Supported Cooperative Work (CSCW '00), Dec. 2000.

* cited by examiner

TECHNIQUES FOR SETTING AND INDICATING PRESENCE FOR A DEVICE

BACKGROUND

Existing techniques indicating the presence of a user include the user manually setting an indicator using a mouse or keyboard, and using an application which may automatically determine the presence of a user. The resulting indicator representing the presence of a user may be displayed on the computer screen. When the computer screen goes blank or enters a locked state, such as when a screen saver is enabled and activated due to computer inactivity, a user is no longer able to set or view his/her presence indicator. One drawback of the foregoing is that in order to set or view the user's presence setting, the user has to activate the computer screen, such as by logging on to the computer.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for specifying a presence setting selection and for displaying a presence indicator status of a user with respect to a device associated with the user. The presence setting selection includes providing an input selection component on a surface of a first component of the device. A presence setting is received at the device in accordance with a manual presence selection made using the input selection component. In connection with the presence indicator status, one or more indicators are provided on a surface portion of a first component of the device. The presence indicator status indicating the presence of the user with respect to the device is received. One or more indicators of the device are set in accordance with said presence indicator status.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
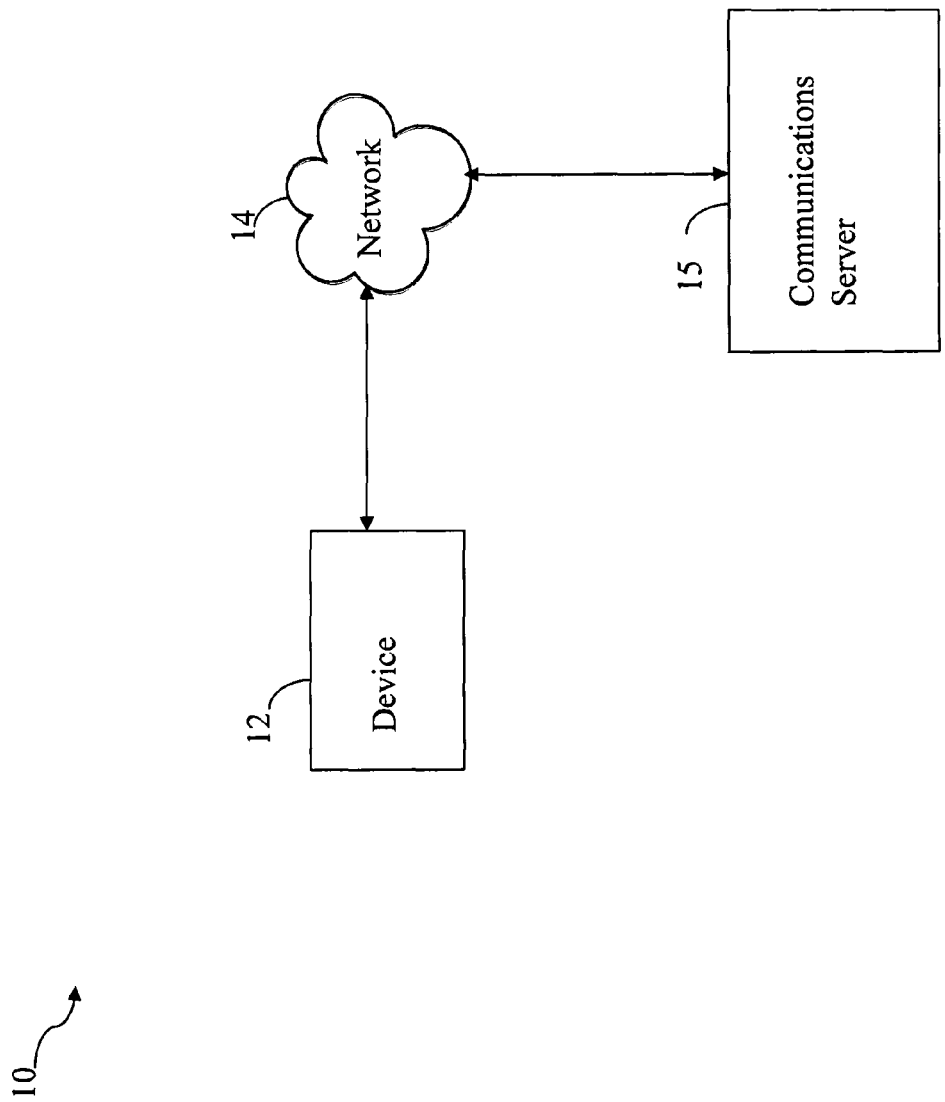
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with specifying a presence setting and displaying a presence indicator status. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a device 12, a network 14, and a communications server 15. The device 12 may be, for example, a user computer, a phone, a PDA or other wireless mobile communications device. The device 12 included in FIG. 1 is exemplary for purposes of illustrating the techniques described herein in connection with specifying a presence setting and displaying a presence indicator status. Any device that has connectivity to the server 15 and having the functionality described herein may be included in an embodiment. Additionally, although only a single device is illustrated, an embodiment may use one or more devices. The device 12 may include a processor used to execute code included in one or more program modules. Described in more detail elsewhere herein are program modules that may be executed by the devices in connection with the techniques described herein. The device 12 may operate in a networked environment and communicate with the communications server 15 and other computers not shown in FIG. 1.

The communications server 15 may be used in connection with processing and routing communications to devices such as 12 connected to the network 14. As will be described in following paragraphs, in one embodiment, a user may manually select a presence setting using a presence setting input component of the device 12. The presence setting may be communicated from device 12 to the communications server 15. The communications server 15 may subsequently provide the device 12 with a presence indicator status. The device 12 may display the presence indicator status on a presence indicator display component of the device 12. A presence indicator status may be determined for each device. For example, as will be described herein in more detail, when a user is determined to be "present" with respect to a registered device for the user, the device may accordingly display a visual indicator in accordance with the current "present" mode. When the user is determined to be "away" with respect to a registered device for the user, the device may accordingly display a different visual indicator in accordance with the current "away" mode.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s).

Figure 2:
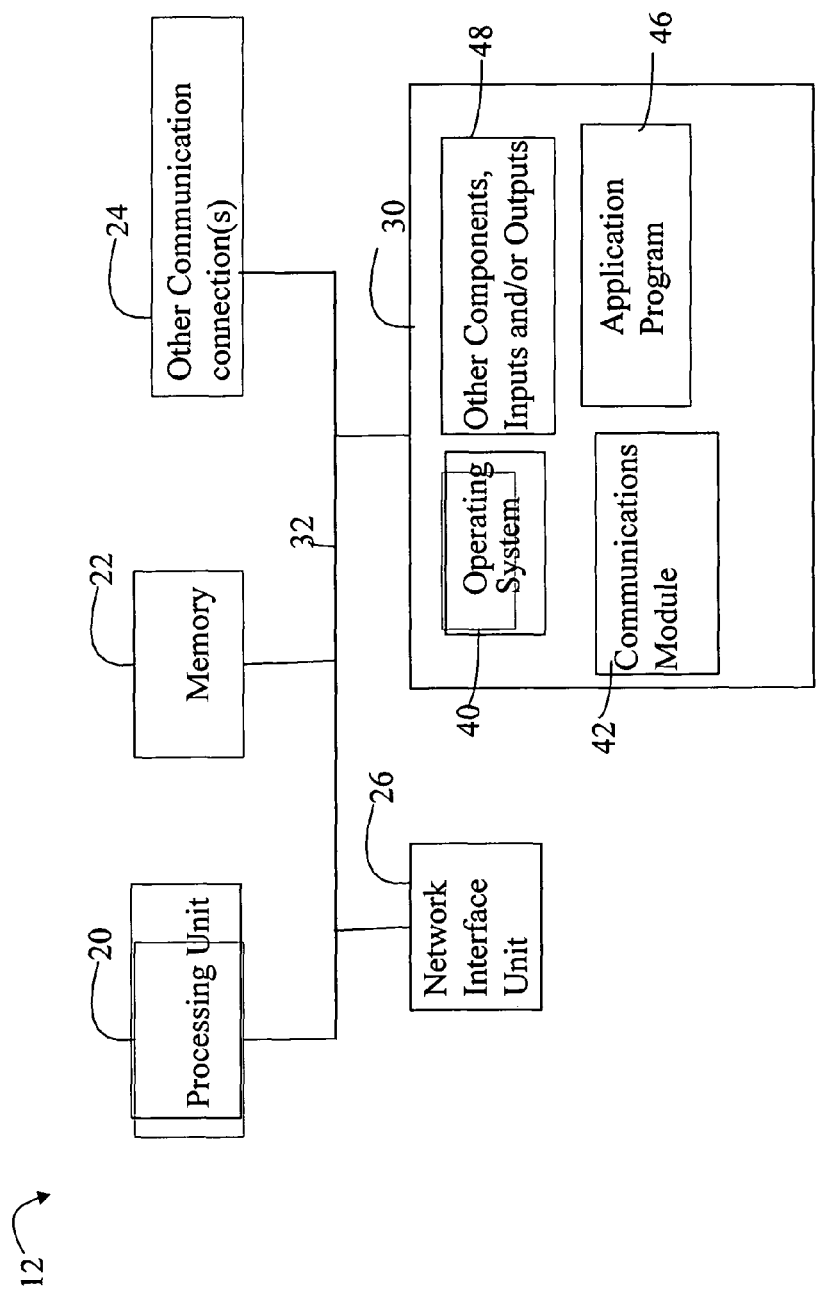
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, a communications module 42, one or more application programs 46, and other components, inputs, and/or outputs 48.

The operating system 40 may be any one of a variety of commercially available or proprietary operating systems. The operating system 40, for example, may be loaded into memory in connection with controlling operation of the user computer. One or more application programs 46 may execute in the device 12 in connection with performing user tasks and operations.

The communications module 42 may be used in connection with processing a user's presence setting as may be manually input through a component of the device 12. The communications module 42 may subsequently facilitate communicating the setting to the communication server 15. Additionally, the communications module 42 may be used in connection with receiving a presence indicator status from the communications server 15 and displaying a visual indicator on the device 12 in accordance with the received status from the server 15. In one embodiment, the received presence indicator status may be characterized as a resultant or aggregate presence status that may be determined by the communications server 15 in accordance with the user's presence setting as manually input on the device 12 and optionally one or more other factors about the particular user with respect to the device 12.

It should be noted that any one of a variety of different techniques may be used to communicate the presence setting to the communications server. For example, the presence setting may be pushed from the device 12 to the communications server 15. It will be appreciated by those skilled in the art that other techniques, such as pulling information from the device 12, polling, and the like, may also be used.

The application program 46 may be any one of a variety of different application programs for the particular device. For example, in one embodiment in which the device 12 is a user computer, the application program 46 may be code which monitors the activity on the computer causing display of a screensaver when there is inactivity.

Figure 3:
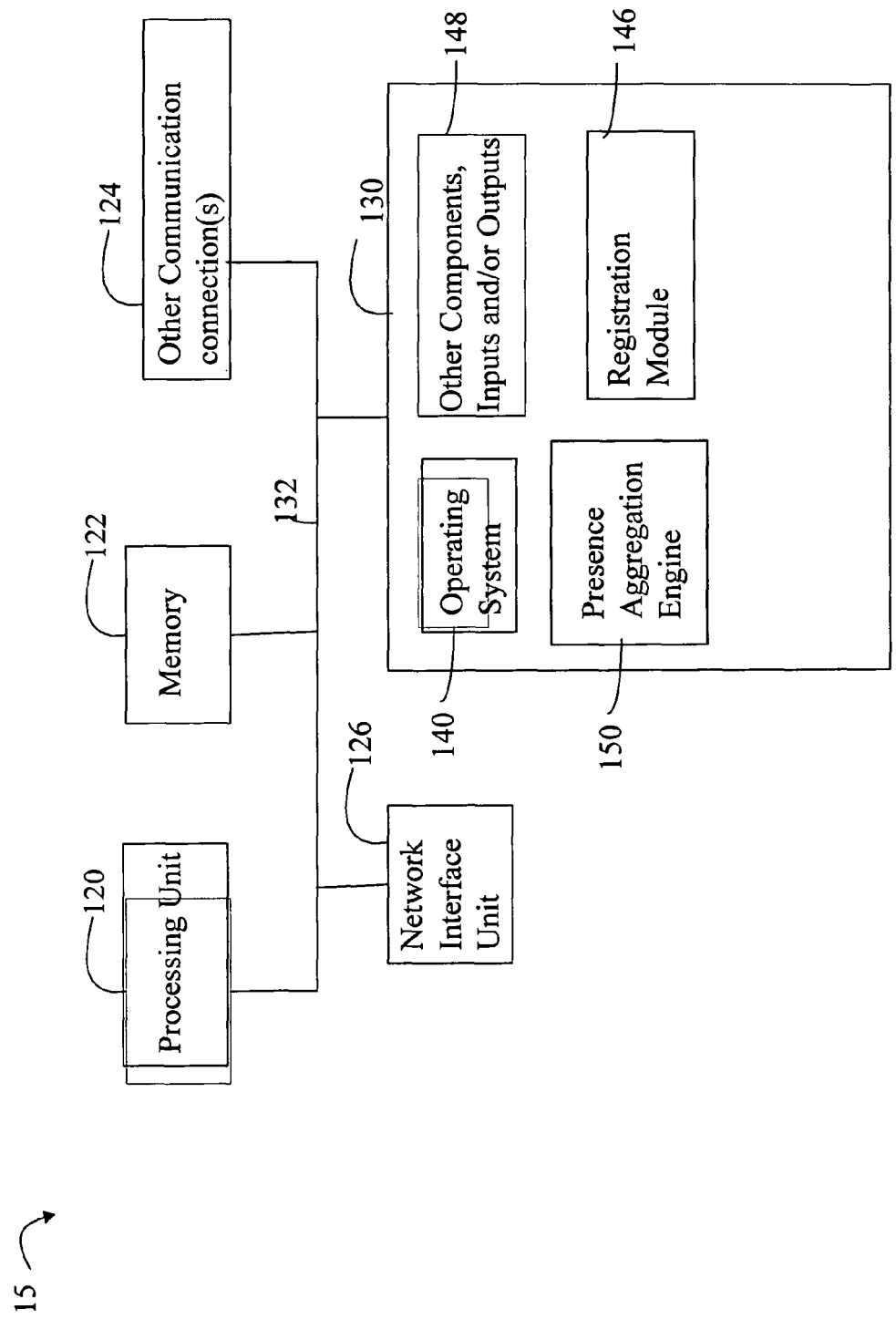
FIG. 3 is an example of components that may be included in an embodiment of a communications server for use in connection with performing the techniques described herein.

Referring now to FIG. 3, shown is an example of components that may be included in the communications server 15 and used in connection with performing the various embodiments of the techniques described herein. As illustrated in FIG. 3, an embodiment of the communications server 15 may include components similar to those described in connection with FIG. 2. Additionally, the communications server 15 may include a presence aggregation engine 150, and a registration module 146. In one embodiment as described herein, the communications server 15 may communicate with one or more devices for registered users.

The registration module 146 may be used in connection with registration of a user. As part of the registration process, the user may be assigned a user identifier and register one or more associated devices for the particular user identifier. As an example of device registration, a user may register one or more devices which are associated with the user's identifier. Each device, such as a phone, computer, mobile phone, or PDA, may have its own IP address or associated location so that the device may be identified in the network in connection with communications, such as for forwarding an incoming transmission received at the server 15. Each registered device may have an associated one or more modes of communication. Modes of communication may include, for example, voice, text, and/or video, indicating which types of communication a particular device is capable. A device may also be enabled/disabled for a particular mode of communication even though the device may be capable of the particular mode. For example, a computer may be registered for a user. The user may specify, either as part of registration or at a later time using various techniques known in the art, that only a selected mode of communication is to be used with the computer. The presence indicator status as described above may be determined by the communications server as an aggregate or composite value in one embodiment using one or more inputs. One input may be the user's manually specified presence setting as provided by a device. Other optional inputs may include, for example, the modes of communication for which a device is capable and/or enabled. The modes of communication for a device may vary in accordance with the particular device and associated user configuration.

The particular values or statuses for a presence indicator status as determined by the communications server and accordingly displayed on a device 12 may vary with the particular device 12. For example, the device 12 may have a first set of possible presence indicator status values if the device is a computer. A second set of possible presence indicator status values if the device is a phone, PDA, or other device.

The presence aggregation engine 150 may aggregate the manually entered user presence setting, optionally along with other information for the device of a registered user, to determine a presence status indicator for the registered user with respect to the device. As described above and elsewhere herein, the other information may include information about modes of communication for the device as well as information that may vary with an embodiment. For example, the engine 150 may be aware that a user is not in the office and may appropriately set indicators for those devices in the office for the user. The one or more inputs and the way in which the engine 150 determines the presence status indicator for each device may vary with embodiment. The presence status indicator for each user with respect to a registered device may be maintained by the engine 150 and may be made available to registered users so that one registered user may be aware of the presence status of a second registered user with respect to a device associated with the second user.

Using the techniques described herein, a registered user may visually view his/her presence status indicator for a device on a physical visual display indicator of the device. Such observation may be made without using, for example, a computer display device, and the selection of a presence setting may be manually made without using a mouse of the computer system. The techniques described herein for displaying a presence status and selecting a presence setting may also be used in connection with a variety of different communications devices having connectivity in the network 14. Particular examples of the visual display indicator and the component that may be used in connection with a user manually selecting a presence setting will now be described.

Figure 4:
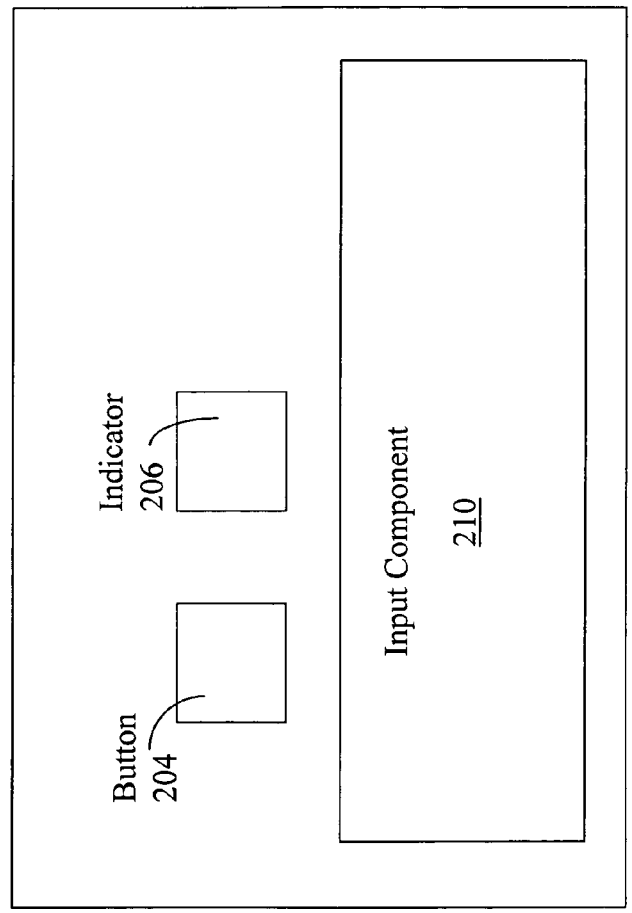
FIGS. 4-8 are examples illustrating different components of input and display arrangements for use with presence setting and displaying a presence indicator status.

Referring now to FIG. 4, shown is an example 200 of components that may be included in an arrangement of a device 12 for use in connection with the techniques for specifying a presence setting on a device and for displaying a visual indicator in accordance with a presence indicator status.

The example 200 includes a selection button 204 and an indicator 206. The component 210 may vary with the device and is used to represent one arrangement of the components 204 and 206 with respect to another input component 210 of the particular device. For example, in one embodiment in which the device is a computer, the components 204, 206 and 210 may be included in a keyboard of the computer. The component 210 may represent that portion of the keyboard including the keys such as alphabetic and numeric keys. Also included in the keyboard may be button 204 and indicator 206.

As described herein, the presence setting may be specified via manual selection by a user. In the example 200, the user may perform such selection using button 204. When depressed, button 204 may cycle through the different presence settings for the device. For example, if the device 12 is a computer, each depression of the button 204 may cycle through a set of presence selections including available or online, away, and do not disturb. Other selections may be included in an embodiment for a computer or other device. The indicator 206 may be a visual indicator, such as an LED, which displays a color in accordance with the presence indicator status returned from the communications server. For example, the indicator 206 may be a tri-color LED displaying one of a number of colors, such as three possible colors, in accordance with the presence indicator status. If the user's presence indicator status changes with respect to the device, the indicator 206 is accordingly updated.

Figure 5:
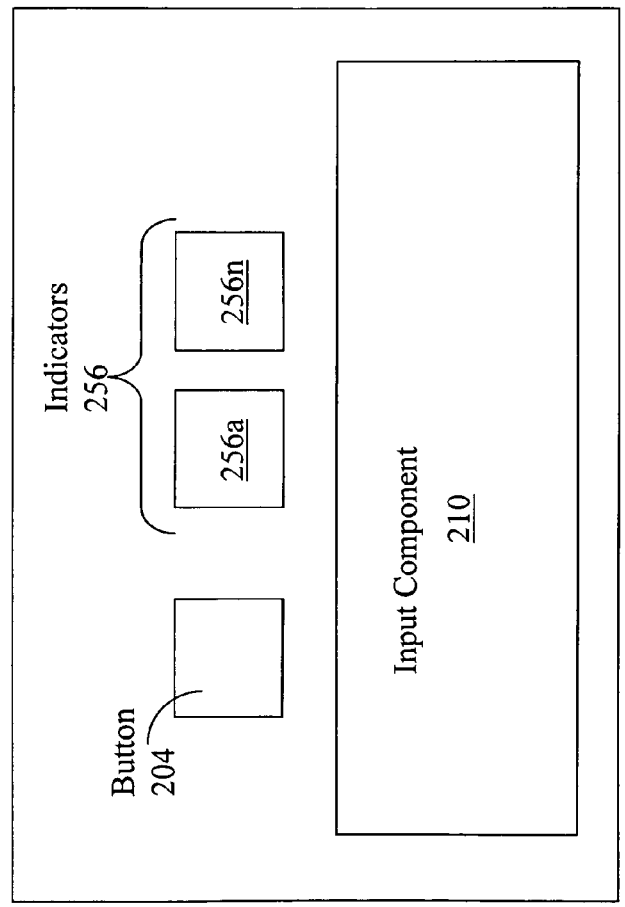

Referring now to FIG. 5, shown is a second example 250 of components that may be included in an arrangement of a device 12 for use in connection with the techniques for specifying a presence setting on a device and for displaying a visual indicator in accordance with a presence indicator status. In the arrangement 250, the components 204 and 210 may be as described in connection with FIG. 4. Rather than have a single indicator which can display one of variety of different colors or other visual indicator states in accordance with the presence indicator status, the embodiment of FIG. 5 includes more than one indicator or instance of an indicator in 256 such as, for example, one or more LEDs. The example 250 illustrates any number of indicators. In one embodiment, a single indicator included in 256 may be displayed in accordance with each possible presence indicator status so that if there are n possible presence indicator status values, element 256 may include n visual indicators with only a single indicator displaying at any time. An embodiment may also uniquely represent each possible presence indicator status value using a combination of more than one indicator in area 256.

Figure 6:
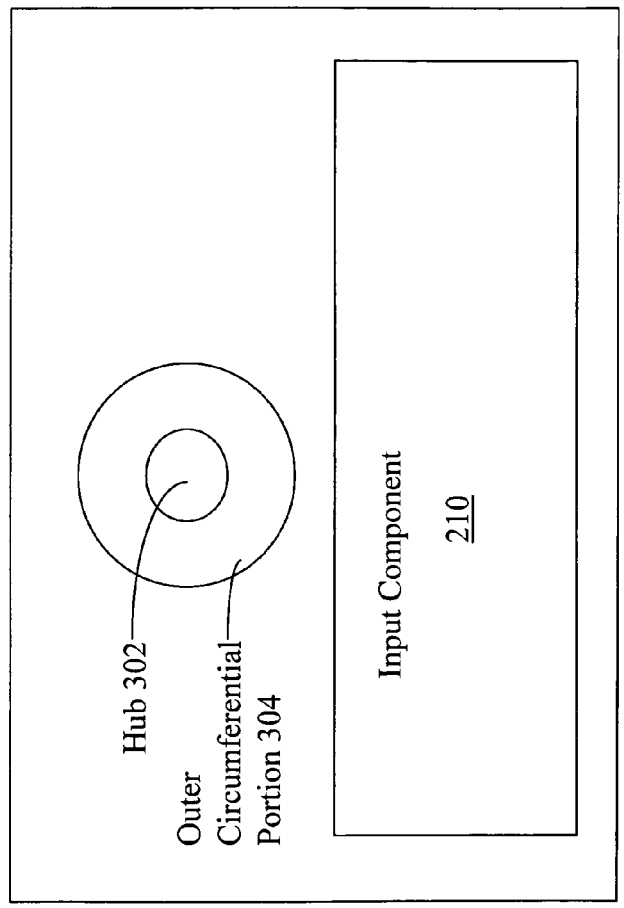

Referring now to FIG. 6, shown is a third example 300 of components that may be included in an arrangement of a device 12 for use in connection with the techniques for specifying a presence setting on a device and for displaying a visual indicator in accordance with a presence indicator status. In the arrangement 300, the component 210 may be as described elsewhere herein in connection with other figures. The elements 302 and 304 may comprise portions of a tactile presence wheel. A user can scroll or roll through the possible presence setting selections using 304. The element 304 may be characterized as an outer circumferential portion of a physical wheel including components 302 and 304. The hub 302 of the wheel display may present a colored visual indicator in accordance with the presence indicator status as returned from the communications server. In one embodiment, the component 304 may be depressed each time to allow a user to cycle through the various presence setting selections. In another embodiment, different portions of 304 may be associated with different presence setting selections so that as different portions of 304 are depressed in different areas, the user scrolls or rolls through the particular setting selection associated with the currently depressed portion of 304.

In one embodiment using the arrangement of the example 300 of FIG. 6, touching the element 304 without cycling through the various presence setting selections may result in a default selection of "available". In other words, by touching the portion 304 without specifically selecting a presence setting indicates that the user is physically present near the device and may be viewed as a shortcut to setting the wheel to "available" without having to cycle through to the appropriate selection.

Figure 7:
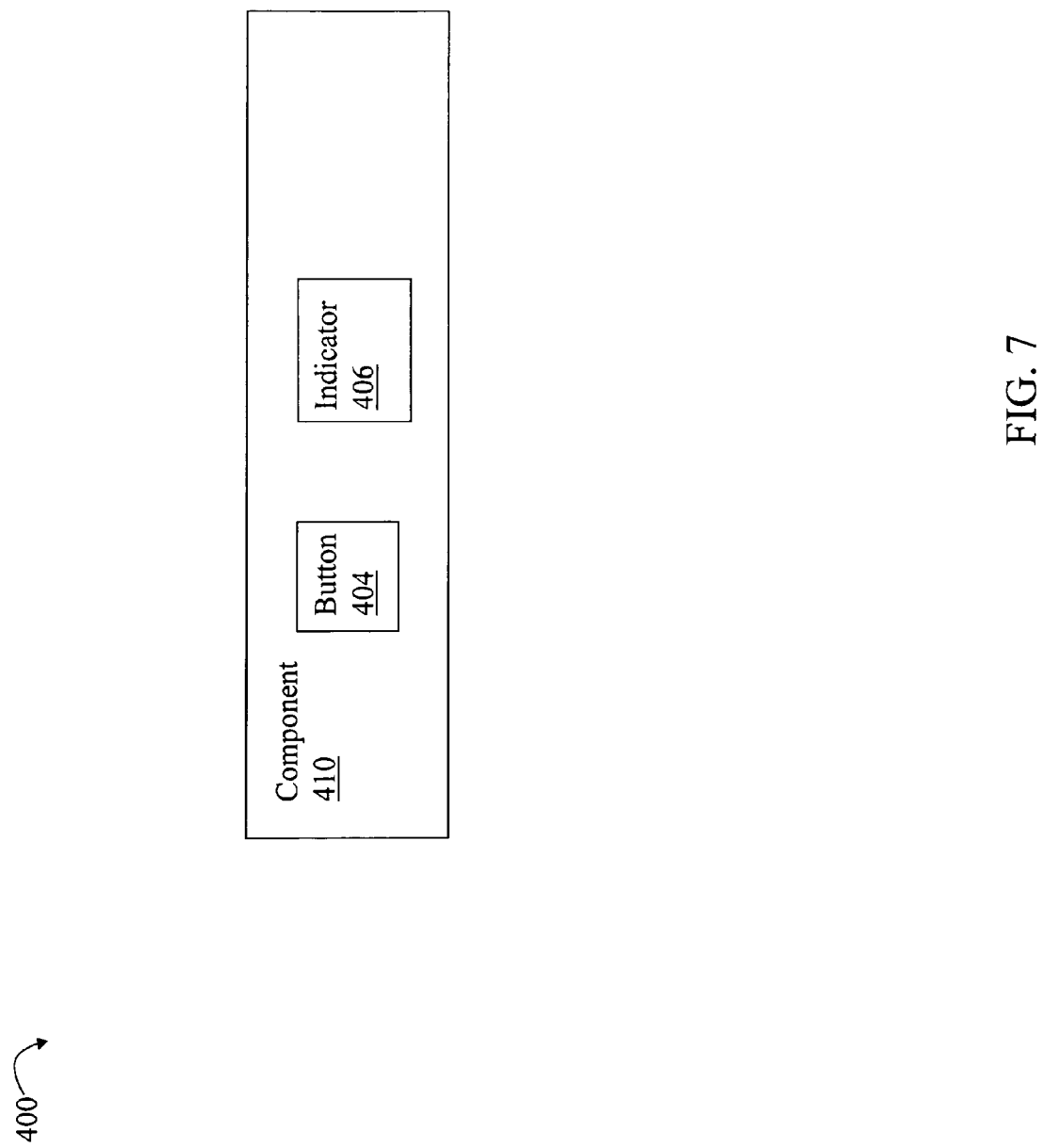

Referring now to FIG. 7, shown is a fourth example 400 of components that may be included in an arrangement of a device 12 for use in connection with the techniques for specifying a presence setting on a device and for displaying a visual indicator in accordance with a presence indicator status. In the example 400, the button 404 is utilized and may behave in a manner similar to button 204 as described herein. The indicator 406 may be utilized and behave in a manner similar to indicator 206. In the example 400, there may be no input or keyboard as illustrated in the examples of FIGS. 4, 5, and 6. In particular, the example 400 may illustrate an arrangement of the elements 404 and 406 on a handset of a phone. It should be noted that element 406 may also include multiple indicators as described in connection with the example 250 of FIG. 5.

Figure 8:
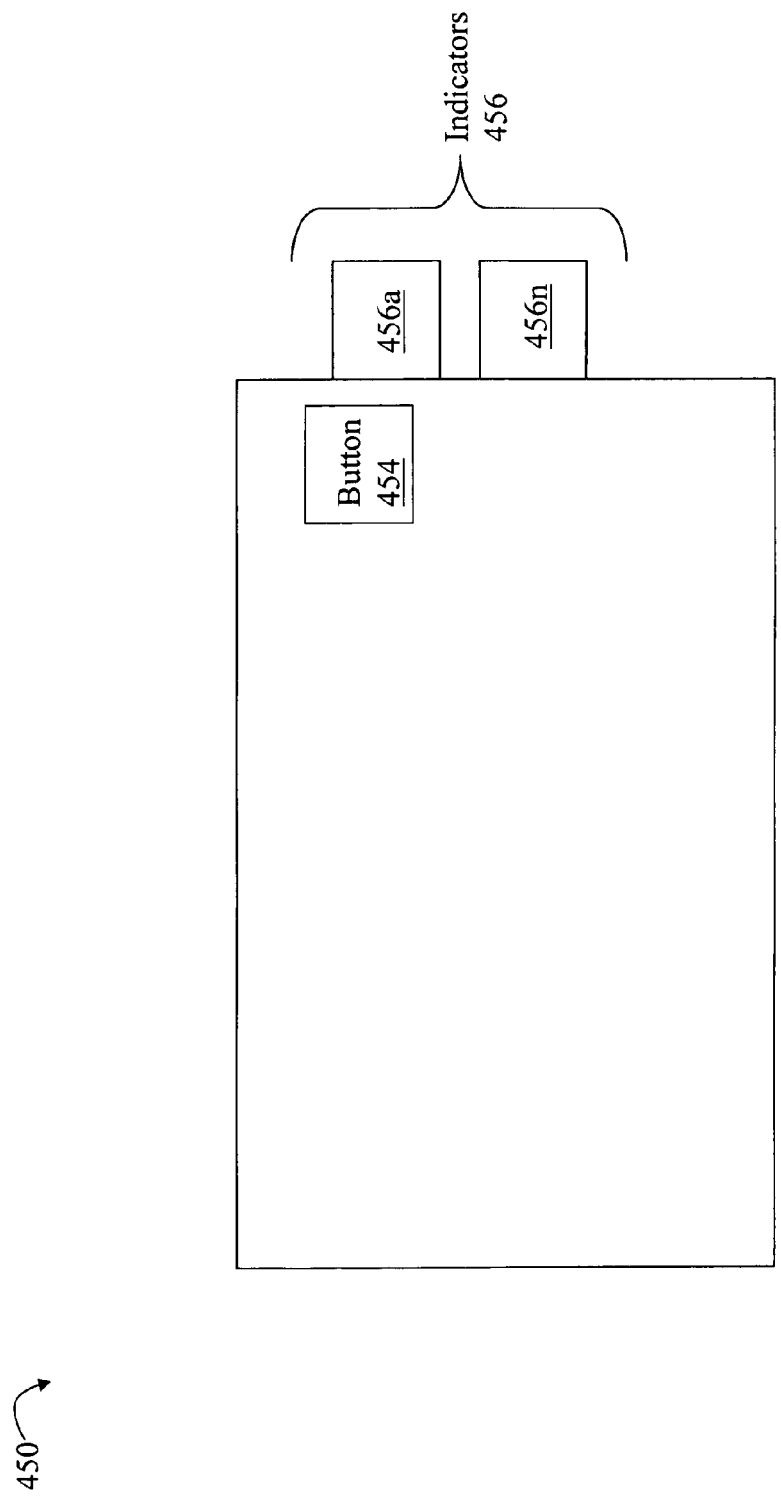

Referring now to FIG. 8, shown is a fifth example 450 of components that may be included in an arrangement of a device 12 for use in connection with the techniques for specifying a presence setting on a device and for displaying a visual indicator in accordance with a presence indicator status. In the example 450, the button 454 is illustrated on the face or surface portion of a device. Button 454 may be utilized and may behave in a manner similar to button 204 as described herein. Element 456 may represent one or more indicators located on a side surface of the device. The indicators of 456 may behave in a manner similar to one or more other indicators as described herein. If 456 includes a single indicator, the indicator may be utilized and function as described in connection with the example 200 of FIG. 4. If 456 includes multiple indicators, the indicators may be utilized and function as described in connection with the example 250 of FIG. 5. It should also be noted that the button 454 may also be located on the side of the device on a same surface as the one or more indicators of 456. In another variation, the element 454 and 456 may be located on different side surfaces of a device.

As described herein, the particular location and type of components used in connection with selecting a presence setting by a user and displaying a presence indicator status, as may be returned from the communications server or other component in an embodiment herein, may vary with the device. If the device is a computer, the forgoing components for presence selection and display of the presence status may be included, for example, on one or more surfaces of a keyboard. If the device is a phone, the foregoing components for presence selection and display of the presence status may be included, for example, on a handset of the phone or next to the number pad under a display.

As illustrated in FIGS. 4-8, in one embodiment, the component used to manually select a presence setting may be, for example, a physical button, wheel, and the like. The component used to facilitate the selection of the presence setting may be a physical element of component of the device dedicated for use in selecting a presence setting. Similarly, an embodiment may include a physical indicator for displaying the presence status dedicated for such use.

In connection with a user's selection of a presence setting and/or displaying a presence indicator status, an embodiment may provide audio feedback to the user. For example, when a user makes a presence selection indicating and "away" presence setting, audio feedback may be provided indicating the selection. Similarly, when an indicator of the device is set, audio feedback may be provided in accordance with the displayed indicator. It should be noted that the time delay between when a selection is made and when an indicator status is displayed may be a very small amount of time such as fractions of a second. Accordingly, if an embodiment provides audio feedback in connection with both selection and display of the indicator, the audio feedback may overlap. An embodiment may therefore provide for a time lag between any two audio feedbacks to ensure no overlap.

Figure 9:
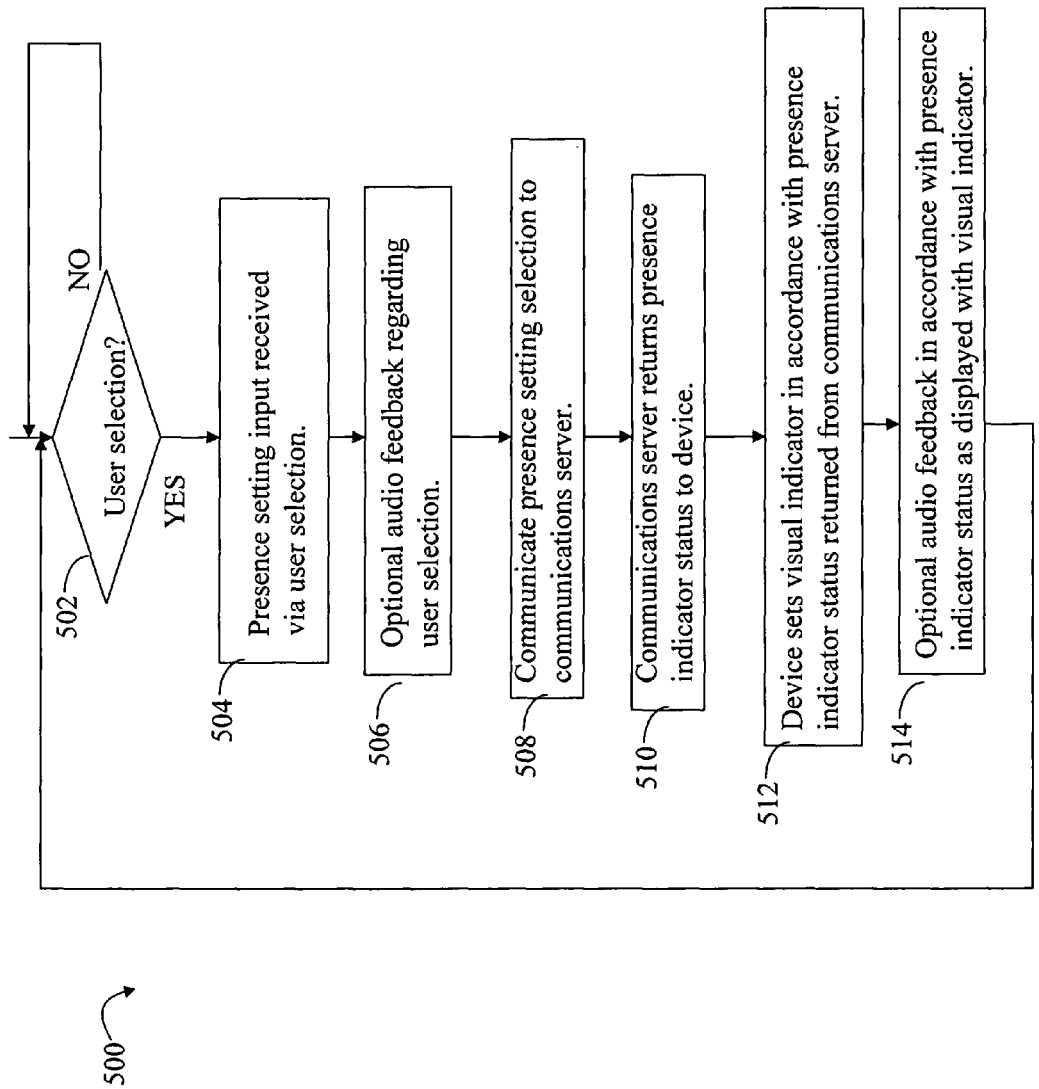
FIG. 9 is a flowchart of processing steps that may be performed in an embodiment in connection with the techniques described herein.

Referring now to FIG. 9, shown is a flowchart 500 summarizing the processing steps just described in connection with the techniques described herein. The steps of flowchart 500 may be performed with respect to a user for a device registered on the communications server 15 for the user. At step 502, a determination is made as to whether the user has made his/her manual selection for the presence setting on the device. If not, control returns to step 502 until step 502 evaluates to yes. If step 502 evaluates to yes, control proceeds to step 504 where the presence setting input by the user is received as by the communications module of the device. At step 506, optional audio feedback may be provided to the user regarding the user's selection. At step 508, the device communicates the user's presence setting selection to the communications server. At step 510, the communications server determines a presence indicator status for the device in accordance with the user's setting selection and optionally other information available to the communications server. The presence indicator status is returned to the device. At step 512, the device sets a visual indicator in accordance with the presence indicator status value returned from the communications server. At step 514, audio feedback may be optionally provided by the device in accordance with the presence indicator status displayed with the visual indicator at step 512. It should be noted that in an embodiment, the total time from when the user manual makes a selection in step 504 to when the visual indicator is displayed may be fractions of a second. As a result, audio feedback provided in steps 506 and 514 may overlap with one another. As such, an embodiment may wait a predetermined amount of time between the audio feedback of steps 506 and 514 in order to avoid any such auditory overlap.

The techniques described herein for specifying a presence setting and/or displaying a presence status indicator for a computer device may be used independent of the state of a computer display device. Additionally, the techniques described herein may be used in connection with other devices, such as phones, PDAs and other wired or wireless devices having connectivity to the communications server in the network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for specifying a presence setting selection for a device comprising:
   providing a physical wheel for use in connection with making a manual presence setting selection on a device of a user, wherein an outer circumferential portion of said wheel comprises a presence setting input component and a hub portion of said wheel comprises one or more indicators for indicating a presence indicator status of the user, said device having connectivity to a communications server that determines the presence indicator status of the user in accordance with a presence setting selection made by the user, said device comprising one or more other input components for receiving manual input from the user and a display screen for displaying the presence indicator status of the user;
   receiving a current presence indicator status of the user at said device from the communications server;
   displaying the current presence indicator status of the user on the display screen of said device for allowing the user to view the current presence indicator status and select a presence setting using said one or more other input components of said device;
   monitoring activity of said device;
   in response to inactivity of said device, causing the display screen of said device to no longer display the current presence indicator status of the user;
   receiving a manual presence setting selection made by the user using said presence setting input component of said wheel, said manual presences setting selection being made when the current presence indicator status of the user is not being displayed by the display screen and without using said one or more other input components of said device used to select a presence setting when the current presence indicator status of the user is being displayed on the display screen;
   communicating the manual presence setting selection made by the user using said presence setting input component of said wheel from said device to the communications server;
   receiving an updated presence indicator status at said device from the communications server; and
   setting said one or more indicators of said hub portion of said wheel in accordance with the updated presence indicator status received from the communications server.

2. The method of claim 1, wherein said hub portion of said wheel presents a colored visual indication of said updated presence indicator status.

3. The method of claim 1, wherein, subsequent depressions of a particular area of said outer circumferential portion scrolls through a plurality of presence settings.

4. The method of claim 1, wherein said device is a computer.

5. The method of claim 4, wherein:
   said one or more other input components used to select a presence setting when the presence indicator status of the user is being displayed on the display screen comprise one or more of a mouse and a keyboard used with said computer, and
   said presence setting input component reflects the manual presence setting selection made by the user.

6. The method of claim 1, wherein said device is a phone.

7. The method of claim 6, wherein said presence setting input component is provided on a handset of said phone.

8. The method of claim 1, wherein said device is a mobile communications device.

9. The method of claim 1, wherein said hub portion of said wheel is a single indicator which is set to one of a plurality of colors in accordance with said updated presence indicator status.

10. The method of claim 1, wherein touching different areas of said outer circumferential portion scrolls through a plurality of presence settings.

11. The method of claim 10, wherein touching said outer circumferential portion without cycling through one or more presence setting options results in a default presence setting selection indicating that the user is available.

12. The method of claim 1, further comprising:
   providing audio feedback in accordance with the selected presence setting of the user.

13. A method for displaying a presence indicator status of a user with respect to a mobile communications device associated with the user, the method comprising:
   providing a physical wheel for use in connection with making a manual presence setting selection on a surface portion of a mobile communications device associated with the user, said wheel comprising an outer circumferential portion for allowing the user to scroll through a plurality of presence settings and a hub portion including one or more indicators for indicating a presence indicator status of the user, said mobile communications device having connectivity to a communications server that determines the presence indicator status of the user in accordance with a presence setting selection made by the user, said surface portion comprising one or more input components for receiving manual input from the user and a display screen for displaying the presence indicator status of the user;
   communicating a presence setting selection made by the user from said mobile communications device to the communications server;
   receiving, from the communications server, a presence indicator status of the user with respect to the mobile communications device in accordance with the presence setting selection made by the user;
   displaying the presence indicator status of the user with respect to the mobile communications device on the display screen of said mobile communications device
   monitoring activity of said mobile communications device;
   in response to inactivity of said mobile communications device, causing the display screen of said mobile communications device to no longer display the presence indicator status of the user; and
   when the presence indicator status of the user is not being displayed by the display screen on said mobile communications device, indicating the presence indicator status of the user using said one or more indicators of said hub portion of said wheel in accordance with the presence indicator status received from the communications server.

14. The method of claim 13, wherein said hub portion of said wheel includes a single indicator which is set to one of a plurality of colors in accordance with a current value of said presence indicator status.

15. The method of claim 13, wherein:
said hub portion of said wheel includes a plurality of color indicators, and
a current value of said presence indicator status is represented by a single unique one of said color indicators at a single point in time.

16. The method of claim 13, wherein:
said hub portion of said wheel includes a plurality of color indicators, and
a current value of said presence indicator status is represented by more than one of said color indicators at a single point in time.

17. The method of claim 14, wherein touching different areas of said outer circumferential portion scrolls through the plurality of presence settings.

18. The method of claim 13, further comprising:
providing audio feedback in accordance with said presence indicator status displayed by said hub portion of said wheel.

19. An apparatus for specifying a presence setting and displaying a presence indicator status comprising:
one or more input components on a surface of a device of a user, said device having connectivity to a communications server that determines a presence indicator status of the user in accordance with a presence setting selection made by the user, said one or more input components for receiving manual input from the user;
a display screen for displaying the presence indicator status of the user;
physical wheel on said surface of said device for use in connection with making a manual presence setting selection, wherein an outer circumferential portion of said wheel comprises a presence setting input component and a hub portion of said wheel comprises one or more indicators for indicating the presence indicator status of the user;
a network interface for communicating a presence setting selection made by the user from the device to the communications server and for receiving a presence indicator status at the device from the communications server;
memory storing computer-executable instructions; and
a processor for executing said computer-executable instructions causing said device to:
receive a current presence indicator status of the user at said device from the communications server;
display the current presence indicator status of the user on the display screen for allowing the user to view the current presence indicator status and select a presence setting using said one or more input components of said device;
monitor activity of said device;
in response to inactivity of said device, cause the display screen to no longer display the current presence indicator status of the user;
receive a manual presence setting selection made by the user using said presence setting input component of said wheel, said manual presences setting selection being made when the current presence indicator status of the user is not being displayed by the display screen and without using said one or more input components of said device used to select a presence setting when the current presence indicator status of the user is being displayed on the display screen;
communicate the manual presence setting selection made by the user using said presence setting input component of said wheel from said device to the communications server;
receive an updated presence indicator status at said device from the communications server; and
set said one or more indicators of said hub of said wheel in accordance with the updated presence indicator status received from the communications server.

20. The method of claim 13, wherein-subsequent depressions of a particular area of said outer circumferential portion scrolls through the plurality of presence settings.

* * * * *

UNITED STATES PATENT AND TRADEMARK OFFICE
CERTIFICATE OF CORRECTION

| | | |
|---|---|---|
| PATENT NO. | : 7,907,051 B2 | Page 1 of 1 |
| APPLICATION NO. | : 11/451820 | |
| DATED | : March 15, 2011 | |
| INVENTOR(S) | : Gurdeep S. Pall et al. | |

It is certified that error appears in the above-identified patent and that said Letters Patent is hereby corrected as shown below:

In column 9, line 57, in Claim 3, delete "wherein," and insert -- wherein --, therefor.

In column 10, line 50, in Claim 13, delete "device" and insert -- device; --, therefor.

Signed and Sealed this
Twenty-sixth Day of July, 2011

David J. Kappos
*Director of the United States Patent and Trademark Office*